United States Patent [19]

Hakansson et al.

[11] Patent Number: 5,558,475
[45] Date of Patent: Sep. 24, 1996

[54] BALL NOSE END MILLS

[75] Inventors: Bjorn Hakansson; Peder Von Holst, both of Sandviken; Rolf Oskarsson, Ronninge, all of Sweden

[73] Assignee: Sandvik AB, Sandviken, Sweden

[21] Appl. No.: 129,330

[22] Filed: Sep. 30, 1993

[30] Foreign Application Priority Data

Sep. 30, 1992 [SE] Sweden .................. 9202838

[51] Int. Cl.⁶ .................. B23C 5/10; B23C 5/14
[52] U.S. Cl. .................. 407/54; 407/119
[58] Field of Search .................. 408/228, 229, 408/230; 407/42, 61–63, 118, 119, 6, 53, 54

[56] References Cited

U.S. PATENT DOCUMENTS

| | | | |
|---|---|---|---|
| 4,145,213 | 3/1979 | Oskarsson et al. | 75/238 |
| 4,618,540 | 10/1986 | von Holst et al. | 428/552 |
| 4,712,948 | 12/1987 | Kidani | 407/42 |
| 4,932,815 | 6/1990 | Krauss | 408/224 |

FOREIGN PATENT DOCUMENTS 0495101  7/1992  European Pat. Off. .

OTHER PUBLICATIONS

Patent Abstracts of Japan, vol. 4, No. 125 (M–30)(607) 3 Sep. 1980 & JP–A–55 083 517 (Mitsubishi) 24 Jun. 1980.
Patent Abstracts of Japan, vol. 9, No. 206 (M–406)(1929) 23 Aug. 1985 & JP–A–60 067 003 (Hitachi) 17 Apr. 1985.
Patent Abstracts of Japan, vol. 12, No. 182 (M–702)(3029) 27 May 1988 & JP–A–62 292 313 (Mitsubishi) 19 Dec. 1987.
Patent Abstracts of Japan, vol. 11, No. 315 (C–451)(2762) 14 Oct. 1987 & JP–A–62 099 467 (Hitachi) 8 May 1987.

*Primary Examiner*—M. Rachuba
*Assistant Examiner*—Kenneth J. Hansen
*Attorney, Agent, or Firm*—Burns, Doane, Swecker & Mathis, L.L.P.

[57] ABSTRACT

There is provided a solid ball nose tool comprising a hard material with 30–70 volume % submicron hard constituents in the form of carbides, nitrides and/or carbonitrides of Ti, Zr, Hf, V, Nb, Ta, Cr, Mo and/or W in a metallic matrix based on Fe, Co and/or Ni. The tool has a constant positive rake angle along the whole end radius of +8+2° and a continuously decreasing clearance angle and towards the center where it is 10±2°.

6 Claims, 2 Drawing Sheets

BALL NOSE END MILLS

BACKGROUND OF THE INVENTION

The present invention relates to ball nose tools, preferably ball nose end mills, with improved properties.

Ball nose end mills are advanced tools which have to manage the most changing working conditions at the same time. The most distinguishing feature of ball nose end mills are good cutting properties which are required in the form of wear resistance and the ability to resist high temperatures at the periphery, i.e., at full nominal measure, and simultaneously as the tool is required to generate chips and function as a cutting tool in the center where the cutting speed approaches zero. Between the periphery and the center, there is a continuous change of the cutting speed through all possible built up edge areas, etc.

Ball nose end mills are often used in difficult operations where demands are very high in terms of surface finish, for example, the aerospace industry when milling wing spars, etc. In this application, no unevenness and notches whatsoever may be tolerated which later may be able to cause failure. Another large area of application is the finishing of molding tools where demands on high surface finish and accuracy to shape with simultaneous high productivity and predictable long tool life are especially great. Further, the tool may not be exchanged during the machining operation which could result in worse precision of the manufactured part as the tool wears.

The geometries which normally exist on today's conventional tools, whether they are manufactured of tough materials such as high speed steel or brittle, more wear-resistant cutting materials such as cemented carbide, often have a negative rake angle and small chip room in and near the center of the ball nose end mill. The drawbacks with this tool are primarily high cutting forces and insufficient space for the chip in the center which results in uneven wear and risk of edge damages.

Through U.S. Pat. No. 4,145,213, a material is known containing 30–70 volume % submicron hard constituents in a metallic binder phase. This material has superior wear resistance compared to advanced high speed steel and can therefore be considered as having properties between cemented carbide and high speed steel. Further, U.S. Pat. No. 4,618,540 discloses superior compound tools made with, e.g., the above material placed in the areas subjected to high cutting speed, and with high speed steel in the center for drilling applications where there is the zero speed problem. The purpose with this later invention was partly with the aid of a tougher core, to obtain a tool with better macro toughness and partly to achieve better grinding economy since the hard constituent rich material is considerably more difficult to grind than, for example, high speed steel. In addition, the zero speed problem and built up edge formation areas were experienced as problematic for the submicron hard material with 30–70 volume % hard constituents.

OBJECTS AND SUMMARY OF THE INVENTION

It is an object of this invention to avoid or alleviate the problems of the prior art.

It is further an object of this invention to provide ball nose end mills with improved properties.

In one aspect of the invention there is provided a solid ball nose tool comprising a hard material with 30–70 volume % submicron hard constituents in the form of carbides, nitrides and/or carbonitrides of Ti, Zr, Hf, V, Nb, Ta, Cr, Mo and/or W in a metallic matrix based on Fe, Co and/or Ni, said tool having a constant positive rake angle along the whole end radius 4 of +8±2° and a continuously decreasing clearance angle towards the center where it is 10±2°, the two angles being measured in a plane perpendicular to the cutting edge.

BRIEF DESCRIPTION OF THE DRAWINGS

The invention is described in the attached drawings wherein.

DETAILED DESCRIPTION OF THE PREFERRED EMBODIMENTS OF THE INVENTION

Figure 1:
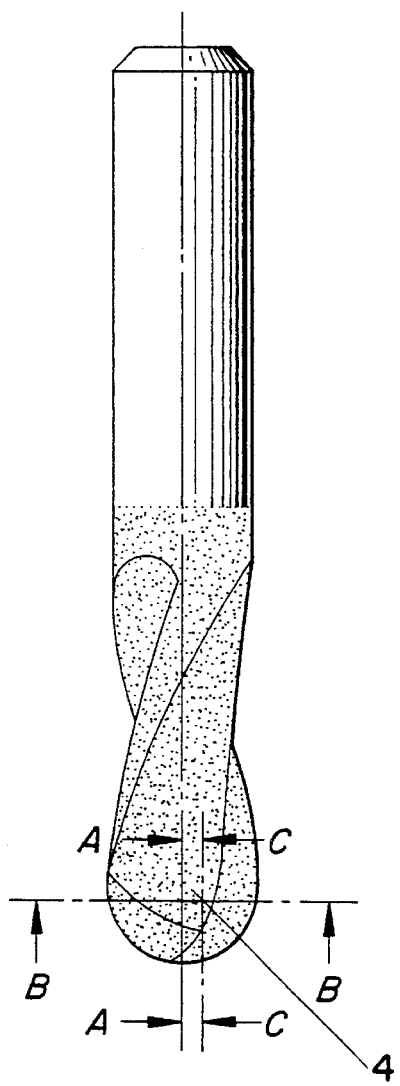
FIG. 1 shows the tool in a side view.
Figure 2:
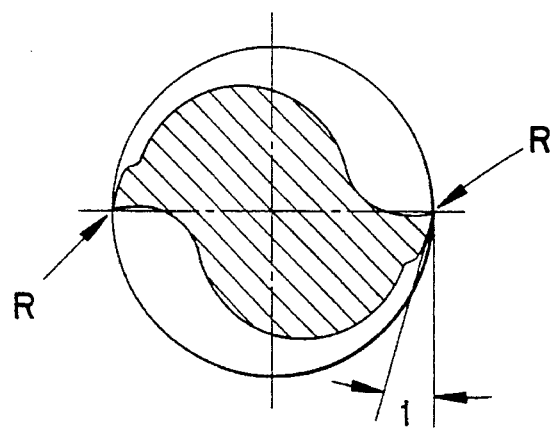
FIG. 2 shows a section through the tool according to line B—B in FIG. 1.
Figure 3:
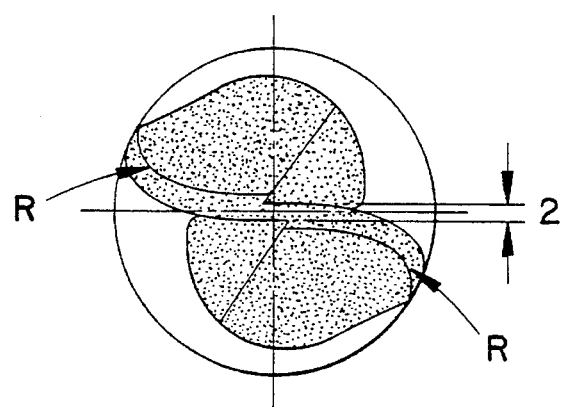
FIG. 3 shows an end view of the tool.
Figure 5:
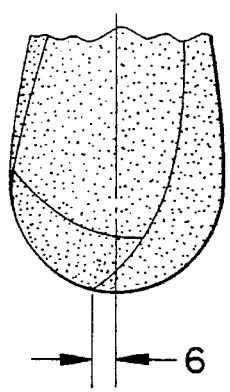
FIG. 5 shows a side view of the front end of the tool.
Figure 4A:
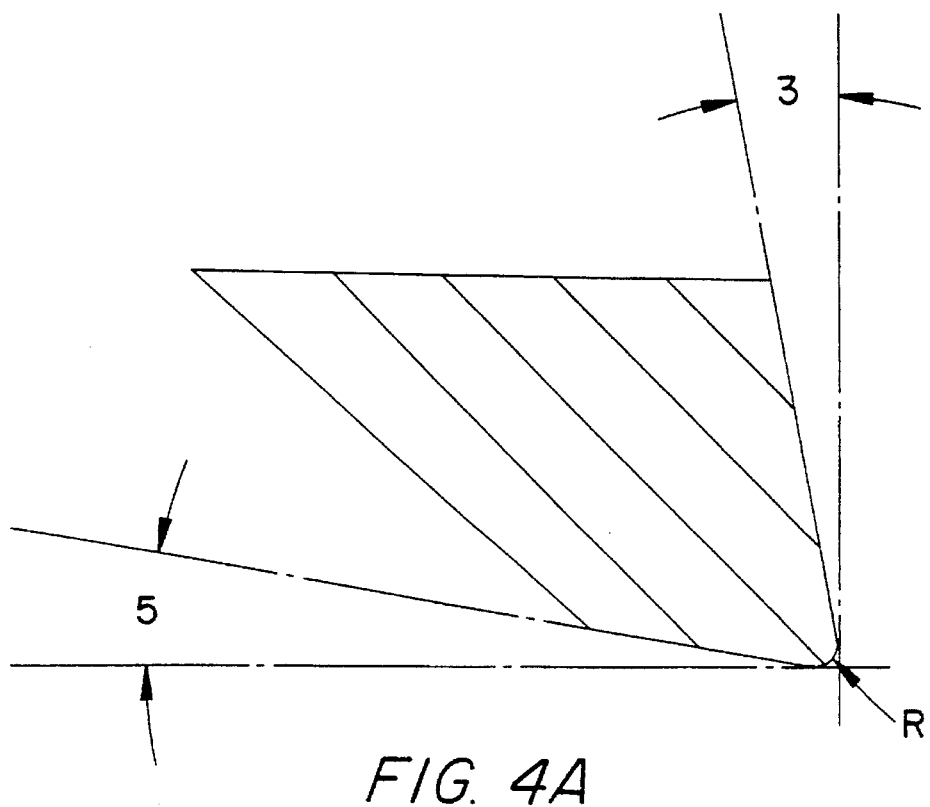
FIG. 4A shows a section through the tool according to line A—A in FIG. 1
Figure 4B:
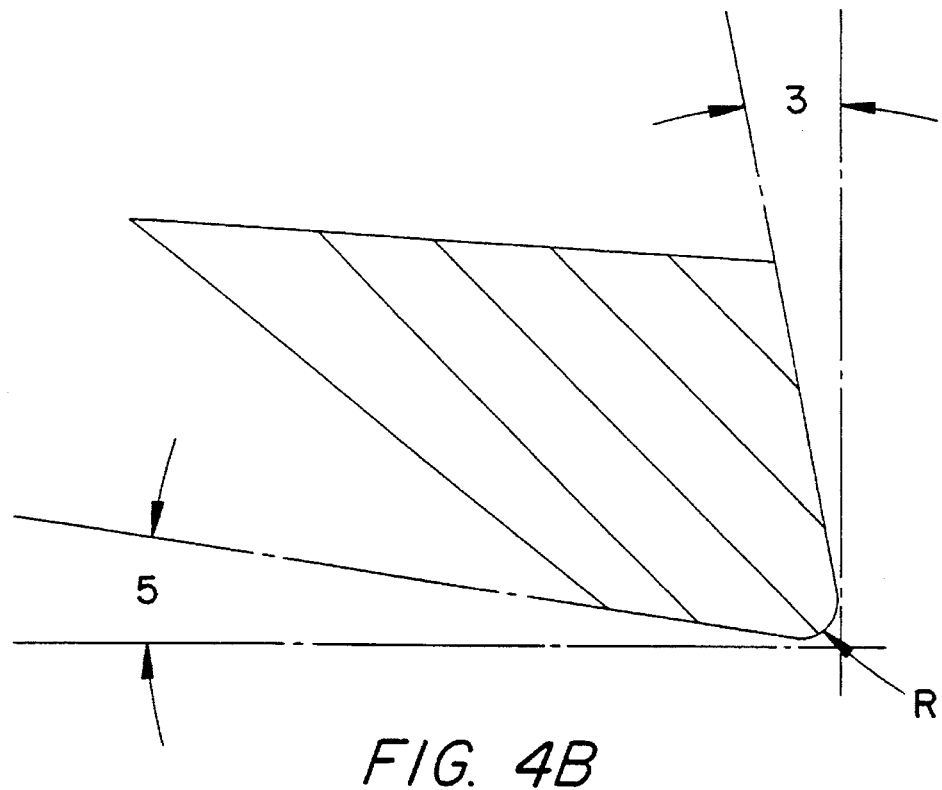
FIG. 4B shows a section through the tool according to line C—C in FIG. 1.

It has now been shown possible to partly improve the toughness behavior of the submicron hard material discussed above, such that long, slender, solid tools with good macro toughness and high rigidity can be made. In addition, it is now also possible to develop a grinding technique to an economically reasonable level to be able to grind advanced edges even in the center of a tool, in this case a ball nose end mill. In combination with advanced geometries, remarkably advanced tools with outstanding ability for chip formation without built up edge formation over a very broad cutting speed area are possible to be produced in this way. This results in low wear and a maintained sharp cutting edge which generates good accuracy to shape and very good surfaces of the work piece. This also applies to work piece materials which of tradition are regarded as very difficult to machine. The tools are used preferably in a coated condition and the so-called PVD-method (physical vapor deposition-method) is the most usual coating method. The coating is performed mainly of titanium-based hard material such as TiN, Ti(C,N), (Ti,Al), etc. Particularly excellent properties have been obtained with 2–4 µm Ti(C,N) coating.

According to the present invention, there now exists long, slender, solid tools, preferably ball nose end mills, of a hard material with 30–70 volume % submicron hard constituents in the form of carbides, nitrides and/or carbonitrides of Ti, Zr, Hf, V, Nb, Ta, Cr, Mo and/or W in a metallic matrix based on Fe, Co and/or Ni. Preferably, the hard material is 30–70 volume % hard constituents of mainly TiN in a matrix of high speed steel type where the enriched hard constituents have a grain size of <1 µm, preferably <0.5 µm. By means of a well-balanced combination between tool material and tool geometry, unique tools with superior performance can be obtained. The material also shows through its fine grain size and good dispersion of hard constituents and binder phase, a uniquely good adhesion ability for a PVD-applied pure hard constituent layer. In earlier applications, the PVD method usually resulted in lower adhesion compared to the more metallurgical bond which arises from the so-called CVD-method (chemical vapor deposition-method). The reason for better adhesion from a CVD application is foremost because CVD takes place at a higher temperature. Nonetheless, in the present invention, good adhesion is also obtained with a coating applied by the PVD-method. The coating is mainly of titanium-based hard material such as TiN, Ti(C, N), (Ti,Al)N, etc. Particularly excellent properties have been obtained with a 2–4 μm Ti(C,N) coating. Even (Ti,Al)N shows great advantages.

Tools according to the present invention function very well in cutting normal steel and in hard workpiece material, having a hardness of 250–450 HB, such as tool steel, sticking material such as stainless steel, aluminum alloys or titanium alloys.

The unique tough and wear resistant properties of the material have made it possible to develop a ball nose end mill with light cutting and durable geometry along the whole radius. This has been obtained by shaping the tool with constant positive rake angle 3 with size +8±2° along the whole radius 4 and a continuous, dimension depending decreasing clearance angle 1 and 5 towards the center where the clearance angle is 10°±2°. In the diameter range of 4–20 mm, the clearance angle varies on the periphery between 17±2° for 4 mm diameter and 12±2° for 20 mm diameter, respectively. The rake and clearance angles are measured in a plane perpendicular to the cutting edge. The tool further contains substantial chip room in the center of the tool and a small distance 2 between the opposite ground ball nose edges 4, namely, 0.10 to 0.25±0.05 mm for the dimensional area 4–20 mm, respectively. The above-mentioned chip room includes an extra recess of 0.35–0.75 mm ground on both sides of the center 6.

The cutting edge of the tool is given an edge rounding treatment which preferably is continuously decreasing towards the center of the tool from 10–30 μm edge rounding R on the periphery to less than 10 μm in its center, preferably 10–20 μm on the periphery, and less than 5 μm in the center. This results in the tools cutting to the very center despite the fact that the chip there becomes extremely thin due to the shape of the edge radius.

What above has been said about solid tools applies also to solid tools with a welded shaft made of other material, e.g., a steel material. The essential feature is that all cutting edges consist of solid hard material as described above.

The dimensional area has above been described as a diameter of 4–20 mm but can of course be increased to a wider range of diameter of, for example, a diameter of 3–25 mm.

The invention is additionally illustrated in connection with the following Example which is to be considered as illustrative of the present invention. It should be understood, however, that the invention is not limited to the specific details of the Example.

EXAMPLE

The example below shows in detail how material and geometry have been joined to products with superior properties. A solid rod of dimension 9.6 mm diameter including capsule was extruded with the method according to U.S. Pat. No. 4,618,540, Example 3. From this rod, 8 mm ball nose end mills with different geometries were ground after heat-treatment. The tools were covered with a 2–4 μm thick TiCN coating by PVD-techniques. A finishing test in SS2541 was performed subsequently with conventional high speed steel and cemented carbide tool as well as in-house made tools for comparison purposes.

Tool A
  Ball nose end mill according to the present invention with, from the periphery to the center, decreasing clearance angle from 15° to 10° and decreasing edge rounding from 20 μm to 5 μm.

Tool B
  Ball nose end mill to a great extent according to the present invention and Tool A, but with a constant clearance angle of 15° and a decreasing edge rounding from 20 μm to 5 μm.

Tool C
  Ball nose end mill manufactured in solid fine-grained cemented carbide, coated with 2–4 μm PVD-coating with a constant clearance angle 10° and a sharp edge.

Tool D
  Ball nose end mill manufactured in solid highly alloyed high speed steel, coated with 2–4 μm TiCN PVD-coating with a constant clearance angle 11° and a sharp edge.

The tools were tested in finishing of a molding tool with axial cutting depth 1 mm and radial cutting depth 1 mm.

Cutting data and result are shown in the table below:

| Test Tool | Cutting Speed (m/min) | Table Feed (mm/min) | Tool Life (m) |
| --- | --- | --- | --- |
| A | 80 | 425 | 129.5 |
| B | 80 | 425 | 92.5 |
| C | 80 | 425 | 91.8 |
| D | 40 | 165 | 24.0 |

The cutting data have followed the manufacturer's recommendation.

The test showed that test tool A, according to the present invention, clearly gave the best results in the sense of long tool life, balanced wear and good surface finish of the work piece.

Test tool B gave worse results than tool A according to the present invention with more unbalanced wear due to small chippings.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A solid ball nose tool comprising a hard material with 30–70 volume % submicron hard TiN constituents in a metallic matrix of high speed steel, the tool having a cutting edge at an axial end thereof, the cutting edge extending along an end radius away from a center of the tool, the cutting edge having a constant positive rake angle along the end radius of +8±2° and a continuously decreasing clearance angle towards the center, the clearance angle being 10±2° at the center, the clearance and rake angles being measured in a plane perpendicular to the cutting edge, the cutting edge including edge rounding, the edge rounding decreasing continuously from 10–30 μm at an outer periphery of the cutting edge to <10 μm at the center, the clearance angle at the outer periphery ranging from 17±2° to 12±2°.

2. The ball nose tool of claim 1, wherein the edge rounding decreases continuously from 10–20 μm at the outer periphery to <5 μm at the center.

3. The ball nose tool of claim 1, wherein the hard constituents have a grain size <0.5 μm.

4. The ball nose tool of claim 1, wherein at least a portion of the tool is coated with a 2–4 μm thick layer of TiCN.

5. The ball nose tool of claim 1, wherein the cutting edge comprises a pair of ball nose cutting edges separated from each other at the center by a distance of 0.10–0.25 mm±0.05 mm.

6. The ball nose tool of claim 1, wherein the tool is an end mill.

* * * * *